United States Patent
Zhang (10) Patent No.: US 9,429,417 B2
(45) Date of Patent: Aug. 30, 2016

(54) TOUCH AND MOTION DETECTION USING SURFACE MAP, OBJECT SHADOW AND A SINGLE CAMERA

(71) Applicant: Hong Kong Applied Science and Technology Research Institute Company Limited, Hong Kong (HK)

(72) Inventor: Wei Zhang, Hong Kong (HK)

(73) Assignee: Hong Kong Applied Science and Technology Research Institute Company Limited, Hong Kong Science Park, Shatin, New Territories, Hong Kong (CN)

( * ) Notice: Subject to any disclaimer, the term of this patent is extended or adjusted under 35 U.S.C. 154(b) by 344 days.

(21) Appl. No.: 14/102,506

(22) Filed: Dec. 11, 2013

(65) Prior Publication Data
US 2014/0098224 A1 Apr. 10, 2014

Related U.S. Application Data

(63) Continuation-in-part of application No. 13/474,567, filed on May 17, 2012, now Pat. No. 9,092,090.

(51) Int. Cl.
*G01B 11/02* (2006.01)
*G06T 7/60* (2006.01)
*G06F 3/042* (2006.01)

(52) U.S. Cl.
CPC .......... *G01B 11/022* (2013.01); *G06F 3/042* (2013.01); *G06F 3/0425* (2013.01); *G06F 3/0426* (2013.01); *G06T 7/60* (2013.01)

(58) Field of Classification Search
CPC ... G01B 11/022; G06F 3/042; G06F 3/0425; G06F 3/0426; G06F 3/0304; G06T 7/60; H04N 7/18; H04N 7/183; H04N 9/3141; H04N 9/3176

USPC .......................................................... 348/61
See application file for complete search history.

(56) References Cited

U.S. PATENT DOCUMENTS 6,177,682 B1   1/2001 Bartulovic et al.
6,965,460 B1 * 11/2005 Gann ..................... H04N 1/193
                                              358/453

(Continued)

FOREIGN PATENT DOCUMENTS

CN       1477478 A     2/2004

OTHER PUBLICATIONS

Search report issued from SIPO on Feb. 24, 2016, for a related China application.

(Continued)

*Primary Examiner* — Shan Elahi
(74) *Attorney, Agent, or Firm* — Ella Cheong Hong Kong; Sam T. Yip (57) ABSTRACT

A method for receiving user inputs in a system comprising a projector and a camera is provided. The method is based on determining an object's height above a reference surface. A surface map is used for mapping a location on the reference surface and a corresponding location in a camera-captured image having a view of the reference surface. In particular, a camera-observed shadow length, i.e. a length of the object's shadow observable by the camera, estimated by using the surface map, is used to compute the object's height above the reference surface (a Z coordinate). Whether or not the object touches the reference surface is also obtainable. After an XY coordinate is estimated, a 3D coordinate of the object is obtained. By computing a time sequence of 3D coordinates, the motional information, such as velocity and acceleration, is obtainable.

21 Claims, 10 Drawing Sheets

(56) References Cited

U.S. PATENT DOCUMENTS

| | | | | |
|---|---|---|---|---|
| 8,042,947 B1* | 10/2011 | Eberl | ................... | A61B 3/113 351/246 |
| 9,092,090 B2* | 7/2015 | Zhang | ................... | G06F 3/042 |
| 2004/0032974 A1* | 2/2004 | Kriesel | ................ | G01B 11/25 382/110 |
| 2004/0227992 A1* | 11/2004 | Putilin | .............. | G02B 27/0093 359/462 |
| 2005/0036672 A1* | 2/2005 | Chen | ................. | G01B 11/2513 382/154 |
| 2005/0174581 A1* | 8/2005 | Liu | ....................... | G01B 11/25 356/602 |
| 2005/0271264 A1* | 12/2005 | Ito | ......................... | G06T 5/006 382/154 |
| 2006/0001739 A1* | 1/2006 | Babayoff | .......... | A61B 1/00009 348/49 |
| 2006/0038879 A1* | 2/2006 | Kremen | ........... | H04N 13/0029 348/51 |
| 2006/0158662 A1* | 7/2006 | Schelinski | ............ | G01B 11/24 356/602 |
| 2007/0201863 A1 | 8/2007 | Wilson et al. | | |
| 2008/0024768 A1* | 1/2008 | Babayoff | .......... | A61B 1/00009 356/73 |
| 2008/0214233 A1* | 9/2008 | Wilson | ................ | H04M 1/7253 455/556.1 |
| 2008/0231926 A1* | 9/2008 | Klug | .................. | H04N 13/0425 359/23 |
| 2010/0134428 A1* | 6/2010 | Oh | ........................ | G06F 3/0234 345/173 |
| 2010/0208275 A1* | 8/2010 | Babayoff | ........... | A61B 1/00009 356/610 |
| 2010/0255179 A1* | 10/2010 | Knox | ................ | H01L 21/67282 427/8 |
| 2012/0243747 A1* | 9/2012 | Kielkopf | ................ | G01B 11/00 382/107 |
| 2012/0293630 A1* | 11/2012 | Persaud | ................... | G01S 5/14 348/47 |
| 2013/0153651 A1* | 6/2013 | Fedorovskaya | ...... | G06K 9/2036 235/375 |
| 2013/0156330 A1* | 6/2013 | Kane | ................. | G06K 9/00201 382/218 |

OTHER PUBLICATIONS

P. Song et al., "Vision-based projected tabletop interface for finger interactions," Proceedings of 2007 IEEE International Conference on Human-Computer Interaction (HCI 2007), pp. 49-58, Dec. 31, 2007.

* cited by examiner

TOUCH AND MOTION DETECTION USING SURFACE MAP, OBJECT SHADOW AND A SINGLE CAMERA

CROSS-REFERENCE TO RELATED APPLICATION

This application is a continuation-in-part of U.S. patent application Ser. No. 13/474,567 filed May 17, 2012, the disclosure of which is herein incorporated by reference in its entirety.

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention generally relates to optically determining positional or motional information of an object with respect to a reference surface, including information on whether the object touches the reference surface. In particular, the present invention relates to a method and a system for optically determining such positional or motional information by using a surface map for mapping a physical location on the reference surface and its corresponding location in a camera-captured image, and by measuring an object shadow's length from an image captured by a single camera.

BACKGROUND

Computer-based automatic detection of an object touching a reference surface and/or determination of positional information (e.g., a coordinate in space) or motional information (e.g., velocity, acceleration) of the object finds a lot of applications in human-computer interactive entertainment and consumer electronics. In one such application, an interactive projection system for providing a display that interacts with a user is required to determine if a finger tip of the user touches a pre-defined region of a screen, in order that the interactive projection system receives user inputs. In another such application related to computer entertainment, the velocity of a user's finger striking a surface is used by a game to predict if the user is decisive or hesitant in providing an input to the game.

To determine positional or motional information of the object, including information of whether the object touches the reference surface, it is required to obtain the object's height above the reference surface by an optical technique. In China Patent Application Publication No. 1,477,478, it is disclosed a device that detects a height of a finger above a touch surface for determining if the finger touches the touch surface. The disclosed device uses two image sensors, i.e. two cameras, for detection. Using two cameras instead of one camera has practical disadvantages in making a product such as higher cost and more space needed to house the two cameras in the product.

Figure 1:
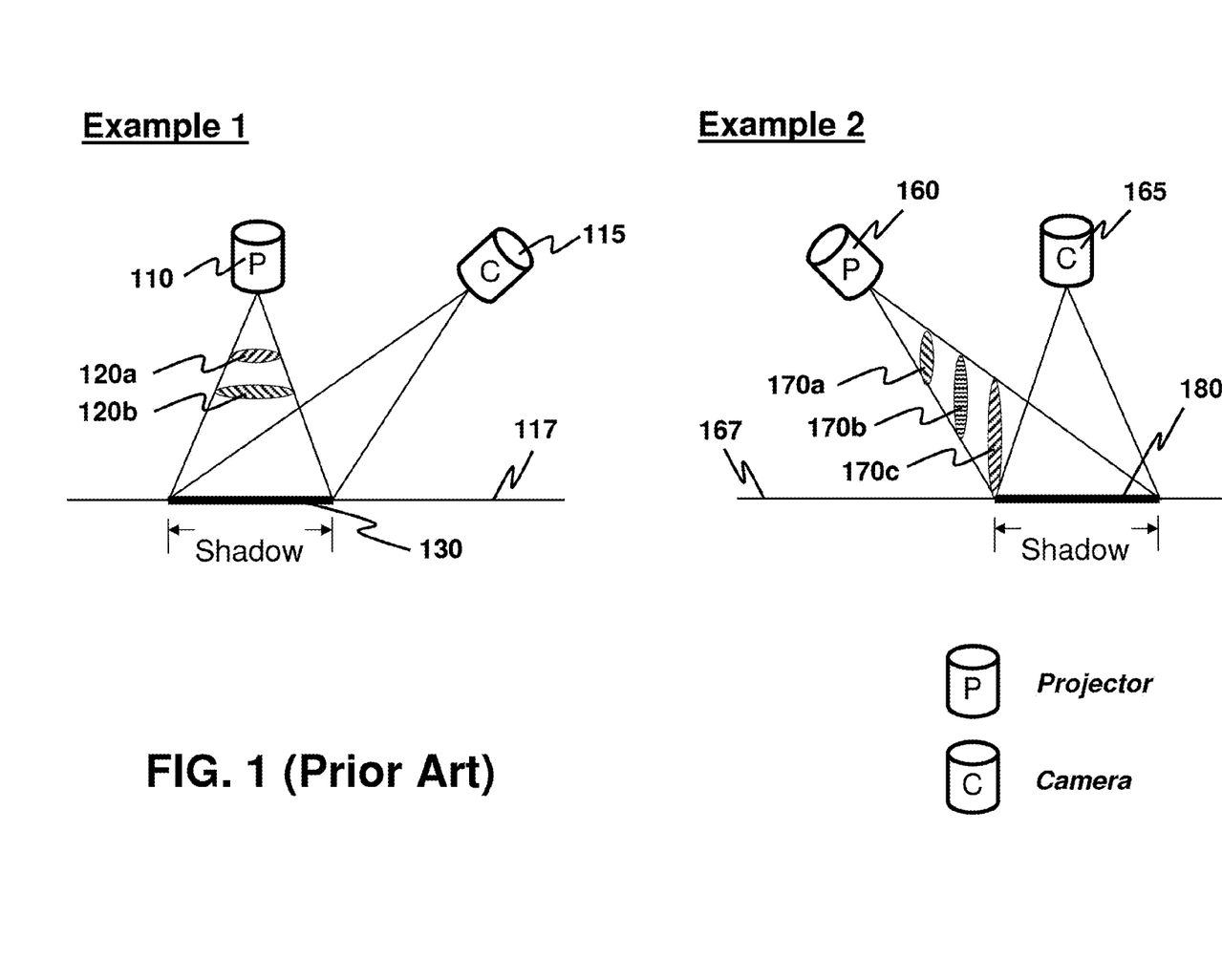
FIG. 1 provides two examples to illustrate that different objects having different heights above a reference surface can produce shadows that are substantially-similar in size, so that using the size information of a shadow alone does not lead to a unique solution to the object's height above the reference surface.

It is desirable to use one camera only. Under this condition, there is a possibility that the object's height above the reference surface can be estimated from the shadow's size after an image of the shadow is captured by the camera. However, FIG. 1 provides two examples to illustrate that objects having different heights above a reference surface, under certain conditions, can produce shadows that are substantially-similar in size. Example 1 considers a projector-camera arrangement based on a system disclosed in US Patent Application Publication No. 2007/201,863 for detecting if a finger touches a surface. In Example 1, a projector 110 projects light along a vertical direction onto a reference surface 117 while a camera 115 captures a view of a shadow 130 from a direction shifted from the vertical direction for estimation of an object's height above the reference surface 117. The shadow 130 may be produced by either a first object 120a or a second object 120b, both having different heights above the reference surface 117. Example 2 is related to a projector-camera arrangement according to U.S. Pat. No. 6,177,682 for determining a height of an object mounted on a surface. In Example 2, an overhead camera 165 captures a view of a shadow 180 produced from light obliquely projected by a projector 160 onto a reference surface 167. Again, it is apparent that the shadow 180 may be produced by different objects 170a, 170b, 170c having different heights above the reference surface 167. In particular, the object 107c touches the reference surface 167 whereas the other objects 107a, 107b do not. As a result, it does not lead to a unique solution to the object's height above a reference surface.

There is a need in the art for unambiguous estimation of a height of an object above a reference surface by using a single camera. Positional or motional information of the object can be obtained thereafter.

SUMMARY OF THE INVENTION

The present invention provides an optical method for obtaining positional or motional information of an object with respect to a reference surface, including detecting if the object touches the reference surface. The reference surface may be substantially flat or non-flat. The object has a pre-determined reference peripheral point. A projector and a camera are used in the disclosed optical method. The projector and the camera are arranged such that when the object not touching the reference surface is illuminated by the projector, a part of the object's shadow formed on the reference surface along a topographical surface line is observable by the camera, the aforesaid part of the shadow having a length being usable for uniquely determining the object's height above the reference surface. The topographical surface line is formed by projecting a line-of-sight path joining the camera and the reference peripheral point on the reference surface. In particular, a surface map is used for mapping a location on the reference surface and a corresponding location in a camera-captured image having a view of the reference surface. The method comprises obtaining the surface map and a surface profile of the reference surface for initialization. The surface profile provides a height distribution of the reference surface. Detecting if the object is present is then performed until the object is identified to be present. At a time instant after the object is identified to be present, a positional-information obtaining process is initiated. This process generates one or more pieces of positional information including whether the object touches the reference surface, the object's height above the reference surface, and a three-dimensional (3D) coordinate of the object. In general, this process is repeated at a plurality of time instants, thereby generating a time sequence of 3D coordinates of the object as one piece of motional information. The time sequence of the 3D coordinates is usable to generate other pieces of motional information including the object's velocity, its acceleration, a traveling direction, a time history of velocity, a time history of acceleration, and a time history of traveling direction.

In determining the surface map and the surface profile, the projector projects a structured-light pattern onto the reference surface. The camera then captures an image having a field of view that includes the structured-light pattern on the reference surface. From the captured image, the surface map that is configured to map any point on a camera-captured image to a corresponding physical location on the structured-light pattern is computed. Furthermore, the surface profile is determined from the structured-light pattern and the corresponding captured image.

In detecting possible presence of the object, a test-for-presence image captured by the camera may be used. The capturing of the test-for-presence image is repeated until the presence of the object is identified.

The positional-information obtaining process is elaborated as follows. First determine a region-of-interest (ROI) on the reference surface such that the ROI comprises an area surrounding and including the reference peripheral point. After the ROI is determined, spot light is directed to an area that substantially covers at least the ROI such that the object around the reference peripheral point is illuminated on the reference surface. The spot light may be generated from the projector or from a separate light source. The camera then captures a ROI-highlighted image. From the ROI-highlighted image, a camera-observed shadow length and a shadow-projector distance are estimated by using the surface map. If the camera-observed shadow length is found to substantially close to zero, it is determined that the object touches the reference surface, thereby providing a first piece of positional information.

As a second piece of positional information, the object's height above the reference surface can be estimated based on a set of data including the surface profile, the camera-observed shadow length, the shadow-projector distance, a distance measured in a reference horizontal direction between the projector and the camera, a distance measured from the projector to the reference surface along a reference vertical direction, and a distance measured from the camera to the reference surface along the reference vertical direction. If the reference surface is substantially flat, the object's height above the reference surface can be computed according to EQN. (4) as stated in the disclosure herein.

The object's height above the reference surface is a Z coordinate constituting the 3D coordinate of the object. A Y coordinate is obtainable based on a distance measured in the reference horizontal direction between the projector and the reference peripheral point. This distance can be computed by either EQN. (3) or EQN. (5) in the disclosure herein. An X coordinate can be obtained directly from the camera captured image and the surface map. Preferably, the camera captured image is the ROI-highlighted image. The 3D coordinate obtained thereby provides a third piece of positional information.

The projector may use infrared light for image projection, or the separate light source is an infrared light source, so that the camera is also configured to sense at least infrared light in image capturing.

Optionally, the projector and the camera are arranged such that: in the reference horizontal direction, the projector is positioned between the camera and the object when the object is present; and in the reference vertical direction, the camera is positioned between the projector and the reference surface.

In another option, a mirror is used to reflect any image projected by the projector onto the reference surface, and to reflect any view appeared on the reference surface for the camera to capture.

Other aspects of the present invention are disclosed as illustrated by the embodiments hereinafter.

DETAILED DESCRIPTION OF THE INVENTION

As used herein, "a reference vertical direction" and "a reference horizontal direction" are defined as two directions that are mutually orthogonal, but these two directions are not further defined with reference to the direction of planetary gravity. Provided that a reference surface is substantially flat, the reference vertical direction is defined herein as a direction substantially perpendicular to the reference surface and the reference horizontal direction is defined with reference to the reference vertical direction. The reference surface may be, for example, a floor surface or a surface of a wall. In case the reference surface is not substantially flat, an imaginary flat surface sufficiently representative to the reference surface over surface roughness thereon is used instead of the original reference surface in defining the reference vertical direction. That is, the reference vertical direction is defined herein as a direction substantially perpendicular to this imaginary flat surface if the reference surface is not substantially flat.

It is used herein in the specification and the appended claims that "a height of an object above a reference surface" is defined as a distance measured from a pre-determined reference peripheral point on the object to the reference surface along a reference vertical direction. One example of the reference peripheral point is a finger tip where the object is a finger. Another example is that the reference peripheral point is a pencil tip if a pencil is the object.

Furthermore, as used herein in the specification and the appended claims, "presence of an object" means that the object is present in a field of view observable by a camera. Similarly, "absence of an object" as used herein means that the object is absent in the aforementioned field of view.

A. Mathematical Development

Figure 2A:
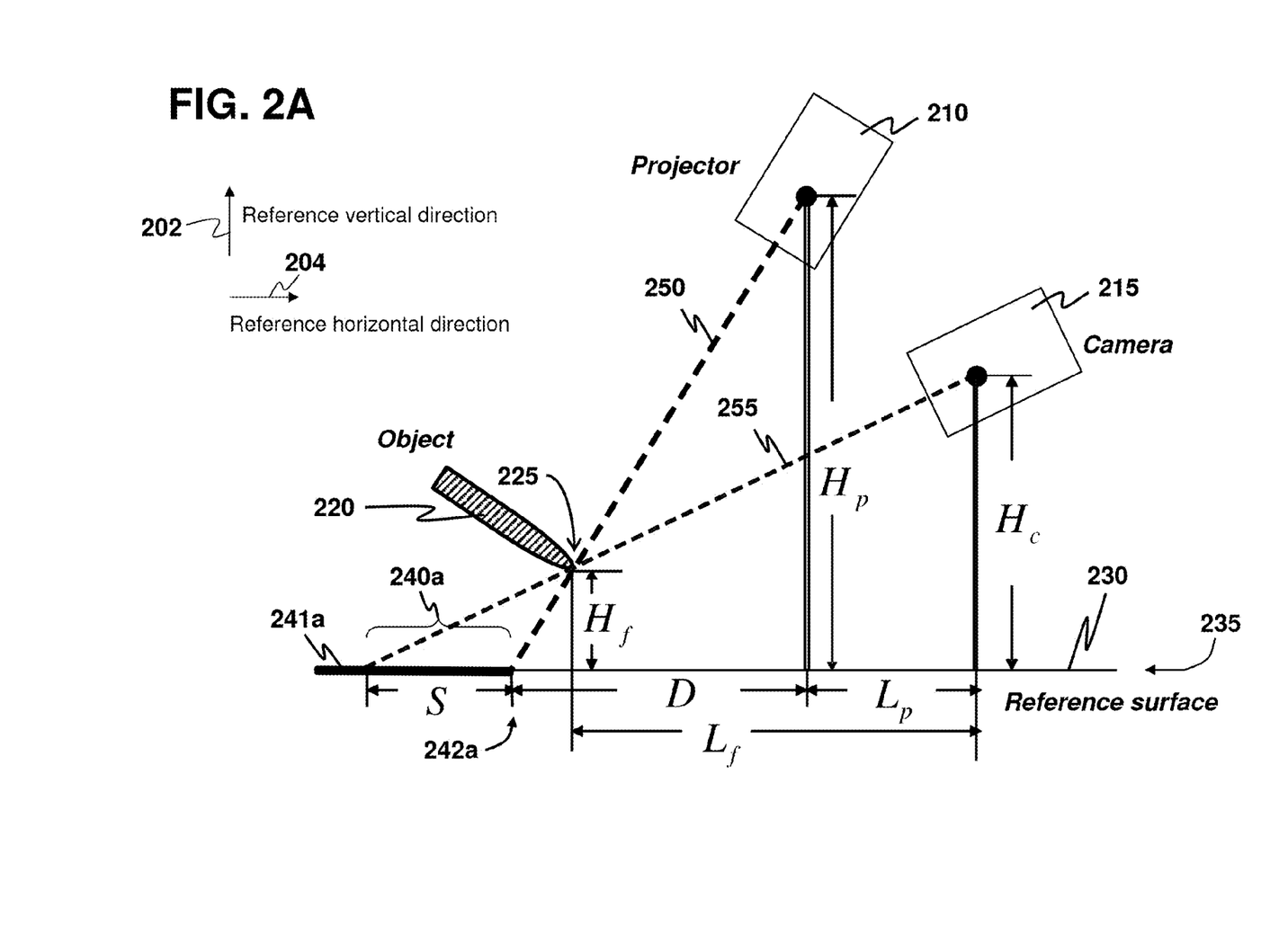
FIG. 2a depicts a model of an object casting a shadow on a reference surface as used in the development of the present invention, where the model leads to a unique solution of the object's height if a camera-observed shadow length is used in the calculation.

FIG. 2a shows a model of an object casting a shadow on a reference surface. The model is used in the development of the present invention. A reference vertical direction 202 and a reference horizontal direction 204 are defined with reference to a reference surface 230. An object 220 having a reference peripheral point 225 as pre-determined is illuminated by a projector 210. Light of the projector 210 is blocked by the object 220 so that a shadow 241a is formed on the reference surface 230. In particular, the light of the projector 210 travels along a line-of-sight path 250 and touches the reference peripheral point 225, thereby forming a starting point 242a of the shadow 241a. A camera 215 is used to capture a field of view including the object 220 and a part of the shadow 241a observable by the camera 215. The part of the shadow 241a observable by the camera 215 is formed along a topographical surface line 235 projected by a line-of-sight path 255 joining the camera 215 and the reference peripheral point 225. The camera-unobservable part of the shadow 241a is blocked from the camera 215 by the object 220.

The part of the shadow 241a observable by the camera 215 has a camera-observable shadow length 240a denoted by S. Let $H_f$ be a height of the object 220 above the reference surface 230. Let $L_f$ be a distance measured in the reference horizontal direction 204 between the camera 215 and the reference peripheral point 225. Let D be a shadow-projector distance, defined as a distance measured in the reference horizontal direction 204 between the projector 210 and the starting point 242a of the shadow 241a. Let $L_p$ be a distance measured in the reference horizontal direction 204 between the projector 210 and the camera 215. Let $H_p$ be a distance measured from the projector 210 to the reference surface 230 along the reference vertical direction 202. Let $H_c$ be a distance measured from the camera 215 to the reference surface 230 along the reference vertical direction 202. As the two triangles having edges overlapped with the line-of-sight path 250 are similar, EQN. (1) is obtained:

$$\frac{D + L_p - L_f}{D} = \frac{H_f}{H_p}. \qquad \text{EQN. (1)}$$

Furthermore, similarity between the two triangles having edges overlapped with the line-of-sight path 255 gives EQN. (2):

$$\frac{S + D + L_p - L_f}{S + D + L_p} = \frac{H_f}{H_c}. \qquad \text{EQN. (2)}$$

From EQN. (1), expressing $L_f$ in terms of $H_f$ gives $$L_f = D + L_p - D\frac{H_f}{H_p}. \qquad \text{EQN. (3)}$$

Substituting EQN. (3) into EQN. (2) followed by algebraic manipulation yields $$H_f = \frac{H_c H_p S}{(S + D + L_p)H_p - H_c D}. \qquad \text{EQN. (4)}$$

It follows that $H_f$, the height of the object 220 above the reference surface 230, is uniquely determinable based on S (the camera-observable shadow length 240a) and D (the shadow-projector distance), both of which can be obtained, as will be explained later, through a camera captured image and a surface map. The other parameters involved in EQN. (4), namely, $L_p$, $H_p$ and $H_c$, may be obtained, e.g., during setting up the camera 215 and the projector 210.

From EQN. (4), it is also apparent that $H_f$=0 if S=0. It follows that if the camera-observed shadow length 240a is found to be substantially close to zero, or if the part of the shadow 241a observable by the camera 215 does not exist, it can be determined that the object touches the reference surface 230.

As an additional result, $L_f$ can be obtained from EQN. (3) with a computed value of $H_f$ given by EQN. (4), or can be directly computed by $$L_f = D + L_p - \frac{H_c DS}{(S + D + L_p)H_p - H_c D}. \qquad \text{EQN. (5)}$$

A Y coordinate of the object can be obtained as $L_f$. As will be shown later, an X coordinate of the object is obtainable from a camera captured image and a surface map. With a further knowledge of $H_f$ computed from EQN. (4), a three-dimensional (3D) coordinate of the object is obtainable.

FIG. 2a depicts that the camera 215 is positioned lower than the projector 210 in the reference vertical direction 202 and located from the object 220 farther than the projector 210 in the reference horizontal direction 204. However, the present invention is not limited to such positional configuration of the camera 215 and the projector 210. The projector 210 may be lower than the camera 215 in the reference vertical direction 202, provided that the projector 210 does not block the line-of-sight path 255. Similarly, the camera 215 may be nearer to the object 220 in the reference horizontal direction 204 than the projector 210 is, provided that the camera 215 does not block the line-of-sight path 250.

Figure 2B:
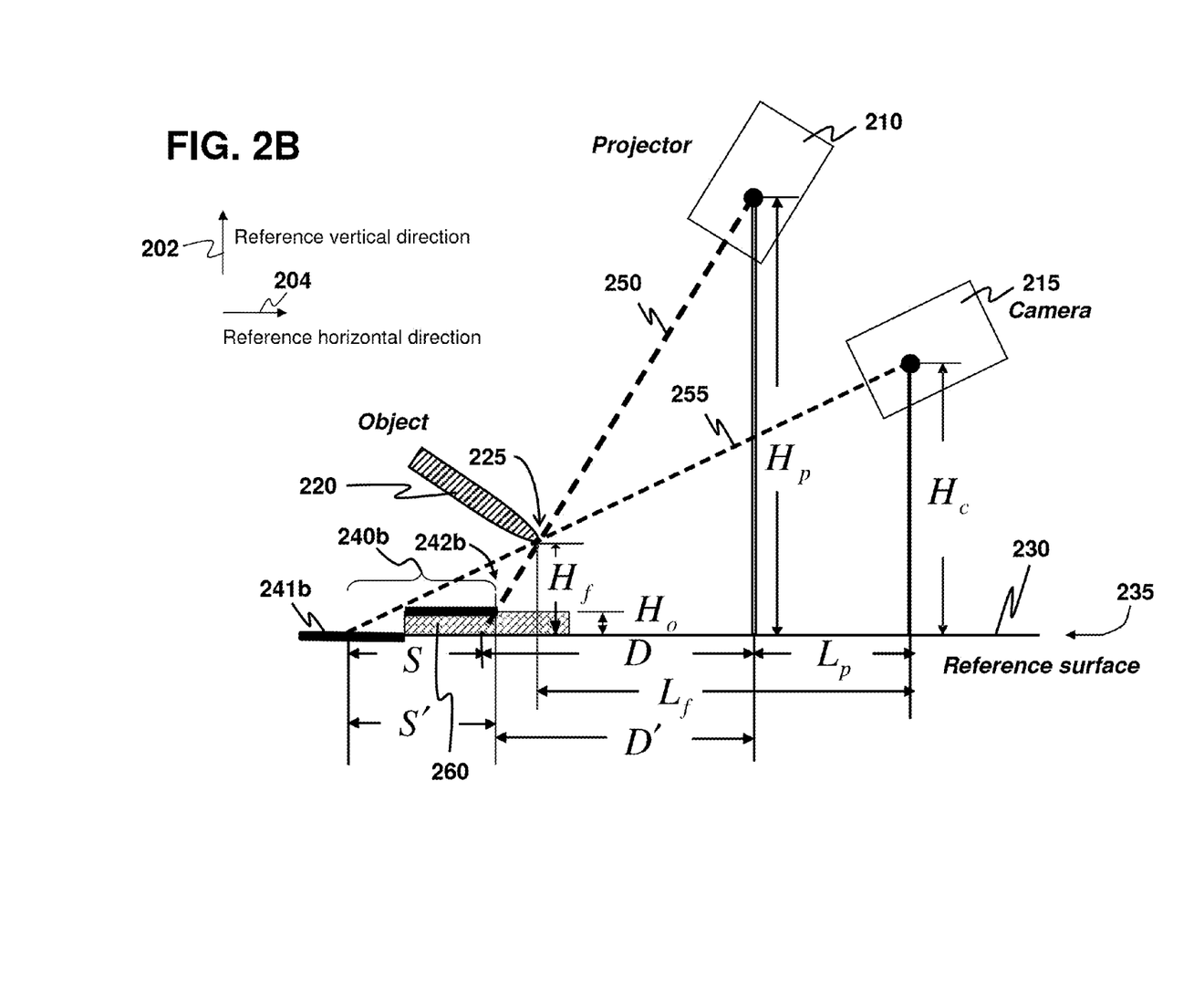
FIG. 2b depicts a similar model but a block is put on the reference surface and under the reference peripheral point to emulate an effect that the reference surface is elevated at the location under the object, illustrating that a unique solution of the object's height can also be obtained even if the reference surface is non-flat.

FIG. 2b shows a model similar to FIG. 2a except that a rectangular block 260 of height $H_o$ is introduced below the reference peripheral point 225 of the object 220. Note that the introduction of the block 260 is similar to raising the reference surface 230 by a height of $H_o$ under the reference peripheral point 225. A distorted shadow 241b is formed, having a shifted starting point 242b. It gives rise to a lengthened camera-observed shadow length 240b, S', and a shortened shadow-projector distance, D'. It can be shown that $$\frac{D'}{D} = \frac{H_p - H_o}{H_p} \quad \text{EQN. (6)}$$

and $$S = S' + D' - D. \quad \text{EQN. (7)}$$

Therefore, $H_f$ is still uniquely determinable. This result implies that even if the reference surface 230 is not substantially flat, a height distribution over the reference surface 230 (which is herein referred to as a surface profile of the reference surface 230) enables the object's height over the reference surface 230 to be uniquely determinable. It is apparent to an ordinary person skilled in the art to make appropriate modification to EQN. (4) to determine an object's height above a non-flat reference surface with a surface profile thereof.

Figure 2C:
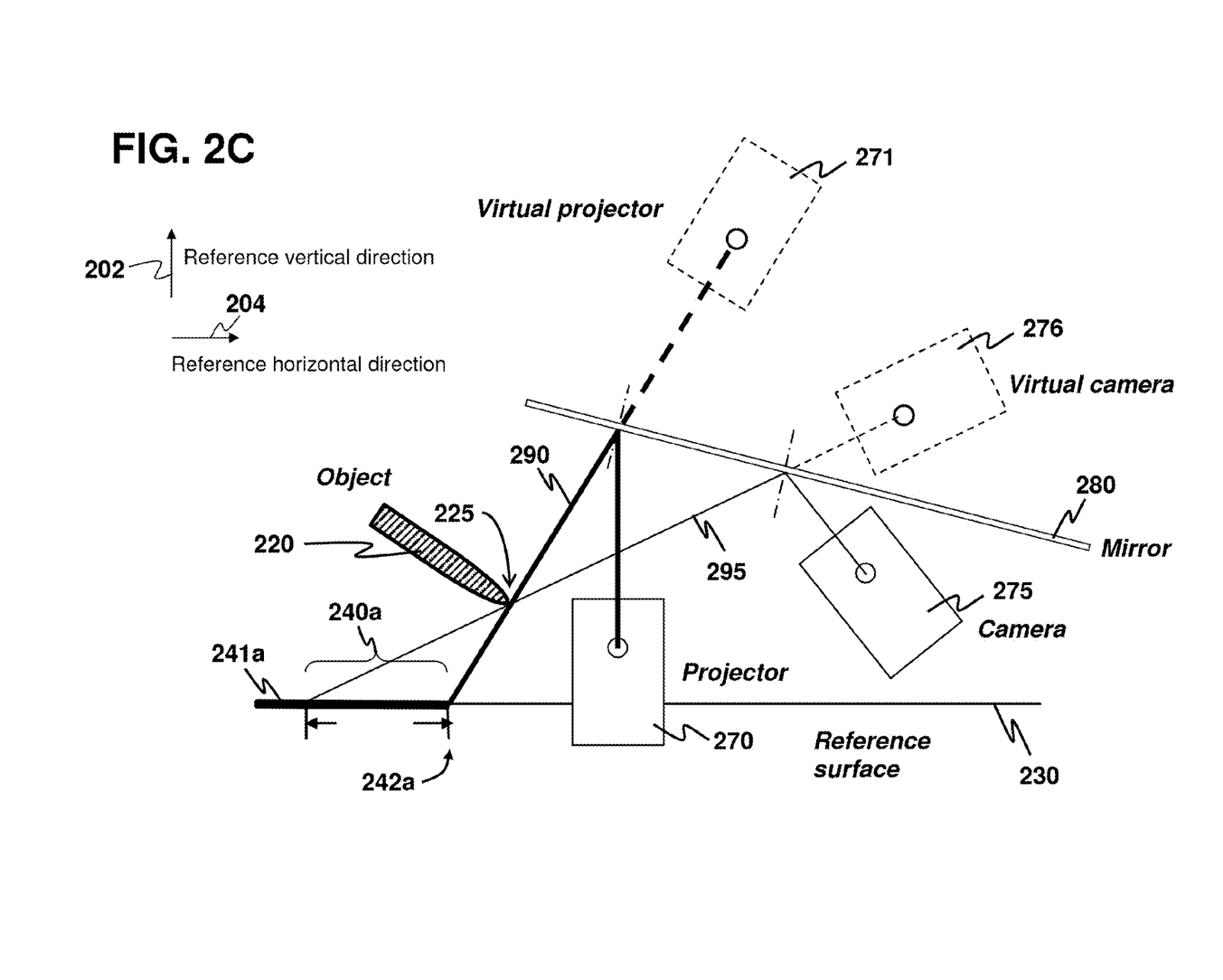
FIG. 2c depicts a model similar to the one of FIG. 2a but a mirror is employed to reflect an image projected by the projector onto the reference surface, and to reflect a view appeared on the reference surface for the camera to capture.

FIG. 2c depicts a model that provides a substantially-similar functional effect as of the model of FIG. 2a. A mirror 280 is used to reflect an image projected by a projector 270 onto the reference surface 230, and to reflect a view appeared on the reference surface 230 for a camera 275 to capture. In the presence of the mirror 280, the projector 270 and the camera 275 introduce a virtual projector 271 and a virtual camera 276, respectively. The virtual projector 271 and the virtual camera 276 provide substantially-similar functional effects of the projector 210 and the camera 215, respectively, of the model of FIG. 2a.

B. The Present Invention

The present invention provides an optical method for a system that comprises a projector and a camera to obtain positional or motional information of an object with respect to a reference surface. The particular advantage of the present invention is that only one camera is used. The object has a pre-determined reference peripheral point. The positional information includes whether the object touches the reference surface, the object's height above the reference surface, and a 3D coordinate of the object. The motional information includes a time sequence of 3D coordinates. In addition, the motional information includes the object's velocity, acceleration, traveling direction, and a time history of the same. The positional and motional information is with respect to the reference surface in a sense that the 3D coordinate of the object is based on a coordinate system using the reference surface as the XY plane if the reference surface is substantially flat. In case the reference surface is non-flat, an ordinary person in the art is capable of adjusting the coordinate system with a knowledge of a surface profile of the reference surface.

Figure 3:
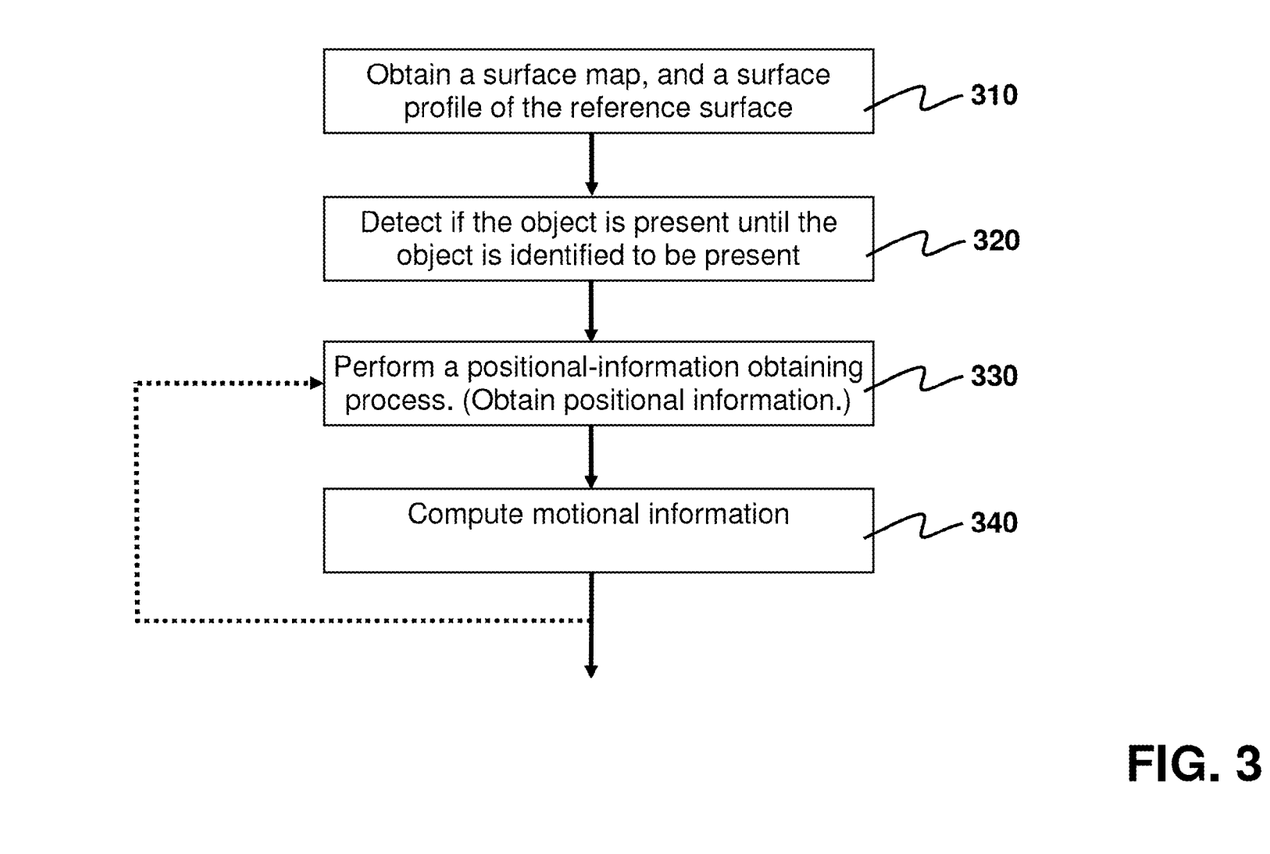
FIG. 3 provides an overview of steps involved in the determination of positional and motional information in accordance with an exemplary embodiment of the present invention.

FIG. 3 is a flowchart providing an overview of major steps involved in the method in accordance with an exemplary embodiment of the present invention. A first step 310 of the method is to obtain a surface profile of the reference surface, and a surface map. As is mentioned above, the surface profile characterizes a height distribution over the reference surface. The surface map is configured to map any point (or any pixel) on an image captured by the camera to a corresponding physical location on the reference surface. By using the surface map, a point or a pixel of interest identified on the captured image can be mapped to the corresponding location on the reference surface. In general, the step 310 is performed at initial system start-up. In a step 320, the system detects if the object is present until the object is identified to be present. The identification of the object's presence triggers performing a subsequent step 330. In the step 330, a positional-information obtaining process is initiated at a time instant after the object is identified to be present, where this process generates one or more pieces of positional information. From the one or more pieces of positional information, the motional information can be computed in a step 340. Most often the positional-information obtaining process in the step 330 and the computation of motional information in the step 340 are repeated a number of times by performing the steps 330, 340 at a plurality of time instants. Usually, the time instants are selected under certain hardware constraints such as the need to align with frame rates of the projector and of the camera.

Furthermore, the disclosed method is characterized by arranging the projector and the camera with a positional configuration such that when the object not touching the reference surface is illuminated by the projector, a part of the object's shadow on the reference surface is observable by the camera. In particular, the shadow is formed along a topographical surface line projected by a line-of-sight path joining the camera and the reference peripheral point. A length of the aforesaid part of the shadow is usable for uniquely determining the object's height above the reference surface in the positional-information obtaining process. This length is regarded as a camera-observed shadow length.

Figure 4:
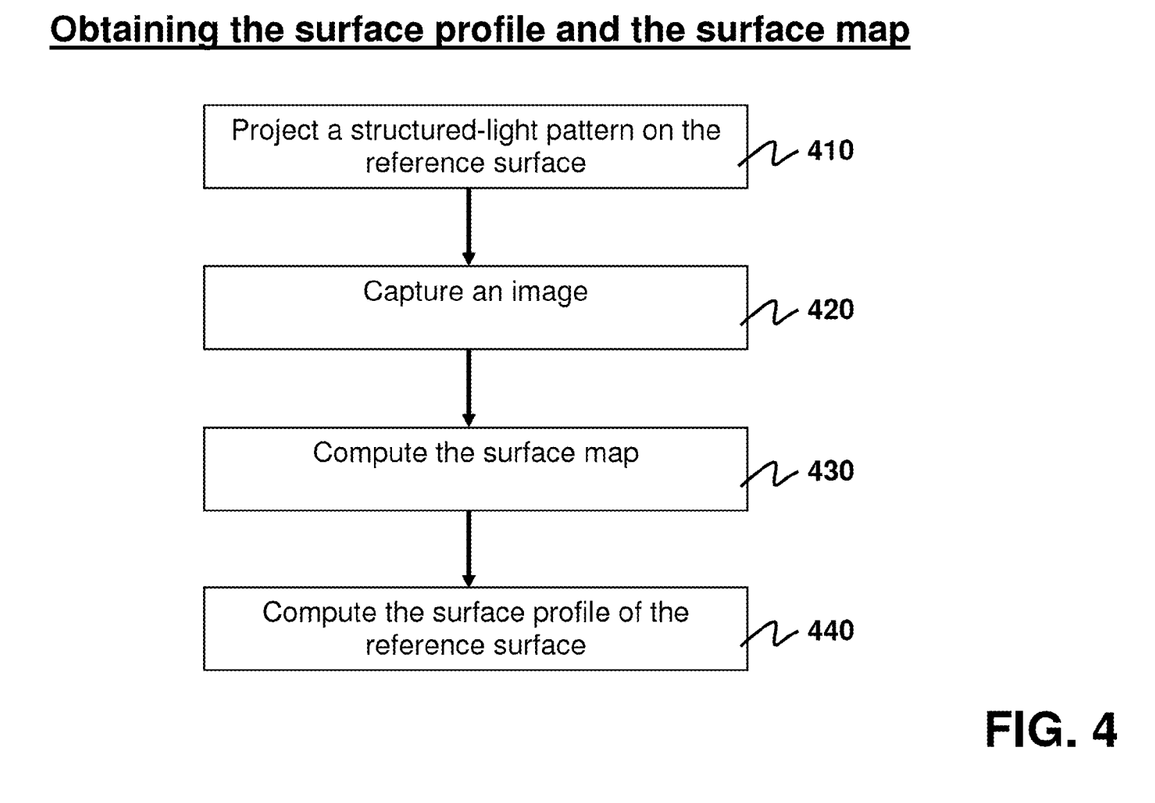
FIG. 4 is a flowchart showing the steps of determining a surface map and a surface profile of the reference surface in accordance with one embodiment of the present invention.
Figure 7:
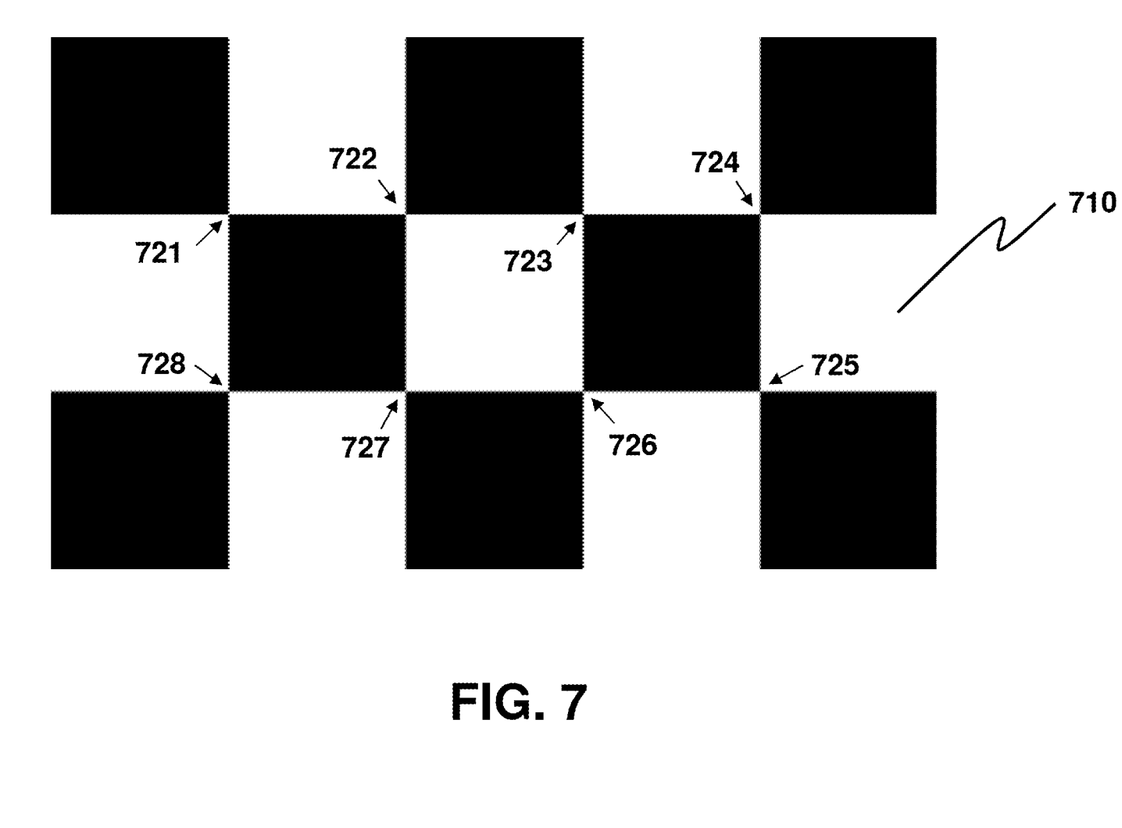
FIG. 7 depicts an example of a structured-light pattern.

Advantageously, the surface map and the surface profile can be determined by techniques disclosed in U.S. patent application Ser. No. 13/474,567. FIG. 4 illustrates determination of a surface map and a surface profile of the reference surface based on one of the aforementioned techniques and in accordance with one embodiment of the present invention. The projector first projects a structured-light pattern onto the reference surface (step 410). Practically, the structured-light pattern is usually designed as a regular pattern such as a structured grid, a regular grid or a rectangular grid. FIG. 7 shows one rectangular grid. Consider using a rectangular grid 710 as an example for realizing the structured-light pattern. The rectangular grid 710 has a plurality of crossing points 721-728. These crossing points 721-728 can be easily recognized in a camera-captured image having a view that includes the reference surface projected with the rectangular grid 710. Each of these crossing points 721-728 as recognized in the camera-captured image has a one-to-one correspondence with a corresponding point of the structured-light pattern. Knowing the projector's height above the reference surface and the projection angle of the projector, one can obtain a physical location (i.e. an XY coordinate) of each of the crossing points 721-728 of the structured-light pattern projected on the reference surface. The surface map can therefore be estimated and constructed. For a non-flat reference surface, lines of the rectangular grid 710 are distorted and/or interrupted when projected on this reference surface. By analyzing deviation of these lines shown on the camera-captured view from the corresponding ones under an assumption of a flat surface, the surface profile can be estimated. The determination of the surface map and the surface profile is summarized as follows. The camera captures an image of the structured-light pattern that is projected on the reference surface (step 420). The surface map is then computed based on matching a set of points on the structured-light pattern and an identifiable set of corresponding points in the captured image (step 430). After the surface map is acquired, the surface profile can also be determined from the structured-light pattern and the captured image (step 440).

Figure 5:
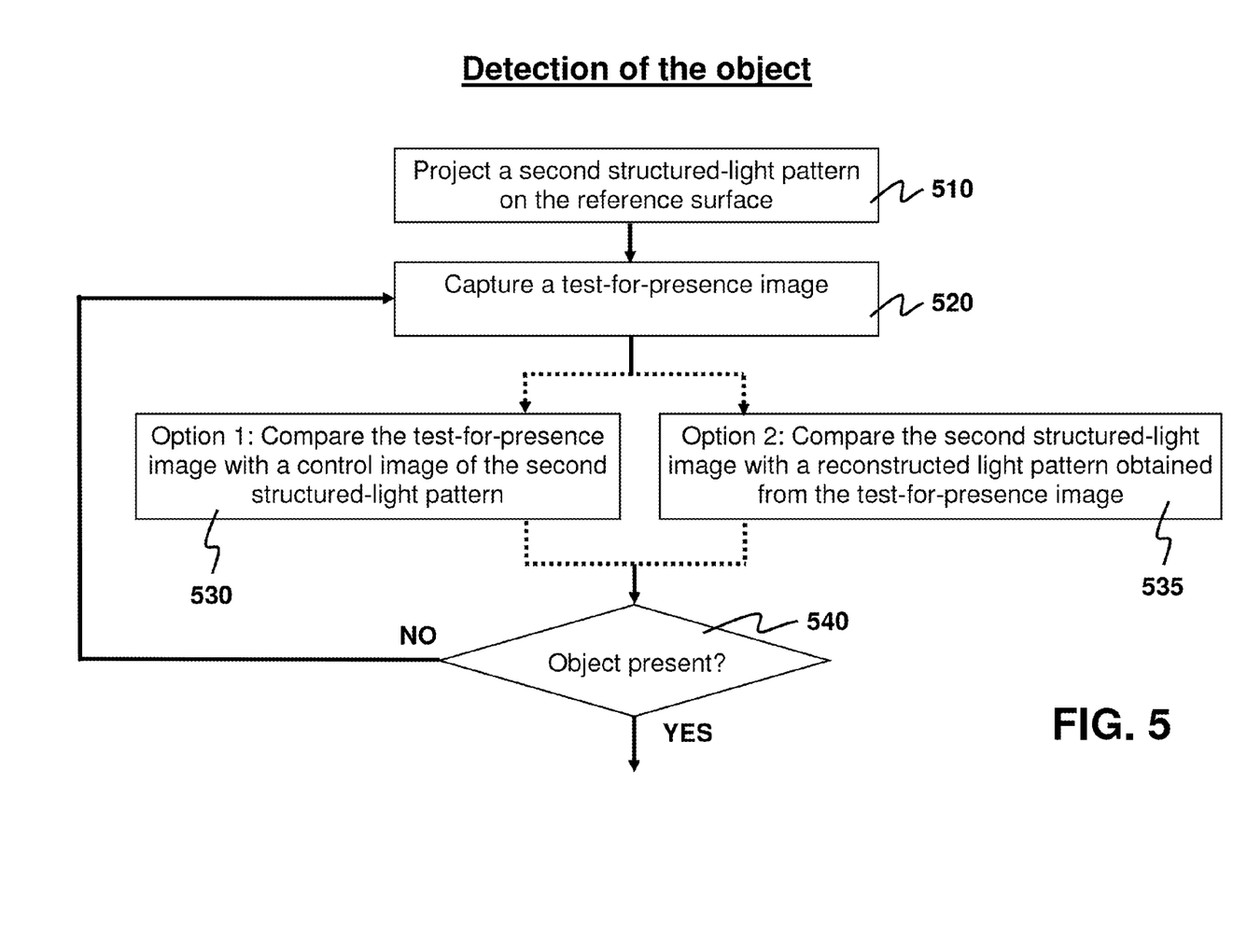
FIG. 5 is a flowchart showing the steps of detecting a presence of the object in accordance with one embodiment of the present invention.

In one embodiment, whether or not the object is present is determined according to a test-for-presence image captured by the camera when a second structured-light pattern is projected by the projector onto the reference surface. FIG. 5 is a flowchart illustrating the detection of the object's presence in accordance with this embodiment. The projector projects the second structured-light pattern onto the reference surface (step 510). The second structured-light pattern is either the structured-light pattern used in the determination of the surface map and the surface profile, or another structured-light pattern adapted to or optimized for the reference surface after the surface profile is obtained. Using said another structured-light pattern is preferable for a non-flat reference surface. The camera then captures a test-for-presence image (step 520). There are two approaches for detecting the object's presence based on the test-for-presence image. In a first object-detecting option, the test-for-presence image is compared with a control image of the second structured-light pattern (step 530). This control image can be obtained by the camera capturing a view of the second structured-light pattern on the reference surface in the absence of the object. Alternatively, the control image can also be obtained by computing from the second structured-light pattern according to the surface map. One approach for comparing the test-for-presence image and the control image is by computing a difference image between the test-for-presence image and the control image. In the absence of the object, the test-for-presence image and the control image are substantially similar so that a majority part of the difference image contains pixels having values close to zero or below a certain threshold value. In the presence of the object, the presence of the object is determinable by, for example, identifying a contiguous region in the difference image where a substantial part of the contiguous region has pixel values greater than the threshold value. Detecting the possible presence of the object by using the difference image has an advantage that computation of the difference image is fast due to computational parallelism so that the frequency of performing detection can be made high. In a second object-detecting option, the second structured-light pattern is compared with a reconstructed light pattern obtained from the test-for-presence image (step 535). The reconstructed light pattern is reconstructed from the test-for-presence image according to the surface map such that the reconstructed light pattern, if under an assumption of the object's absence, should substantially be similar with the second structured-light pattern. Similar to the first object-detecting option disclosed above, a difference image between the second structured-light pattern and the reconstructed light pattern may be computed for detecting if the object is present. The steps 520 and 530 (or 535) are repeated until the object's presence is identified (decision-making step 540).

Figure 6:
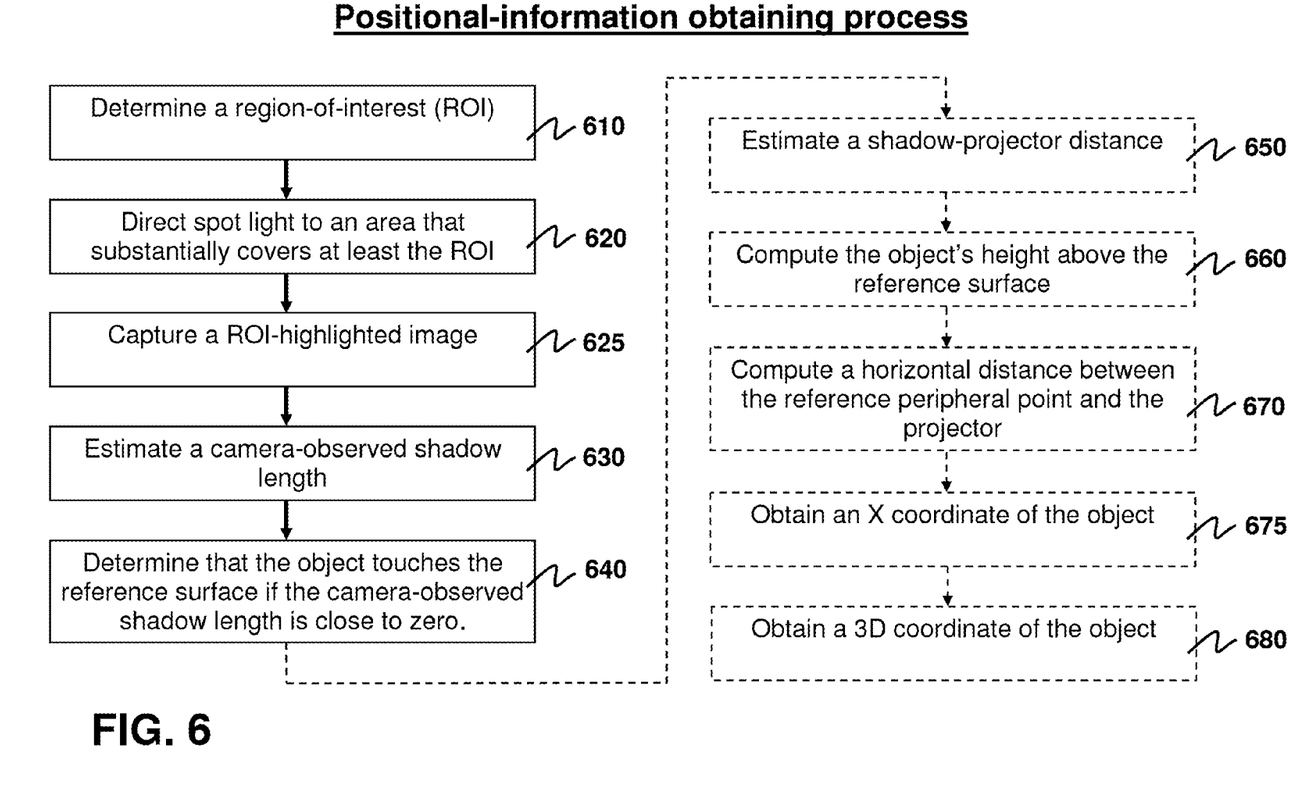
FIG. 6 is a flowchart showing the steps of the positional-information obtaining process in accordance with one embodiment of the present invention.

FIG. 6 is a flowchart illustrating the positional-information obtaining process in accordance with one embodiment of the present invention.

In a first step 610 of the positional-information obtaining process, a region-of-interest (ROI) on the reference surface is determined. The ROI comprises an area surrounding and including the reference peripheral point. Preferably, after the object is identified to be present in the step 320, the determination of the ROI in the step 610 is accomplished based on the last test-for-presence image obtained in the step 320. The ROI is identified by recognizing a pattern on said last test-for-presence image such that the pattern substantially matches the object's feature around the reference peripheral point. In case the object is continuously tracked, the determination of the ROI for a current time instant is simplified with a knowledge of the previously determined ROI in that performing a verification whether the reference peripheral point still resides in the previously determined ROI or a prediction of current ROI position based on the previous reference peripheral point moving trajectory is easier than doing a pattern recognition over a large area.

After the ROI is determined, spot light is directed to an area that substantially covers at least the ROI such that the object around the reference peripheral point is illuminated to form a shadow on the reference surface unless the object is substantially close to the reference surface (step 620). Preferably, the spot light is generated by the projector. However, the spot light may also be generated from a separate light source other than the projector. As is mentioned above, the part of the shadow observable by the camera is formed along a topographical surface line projected by joining the camera and the reference peripheral point.

Figure 8:
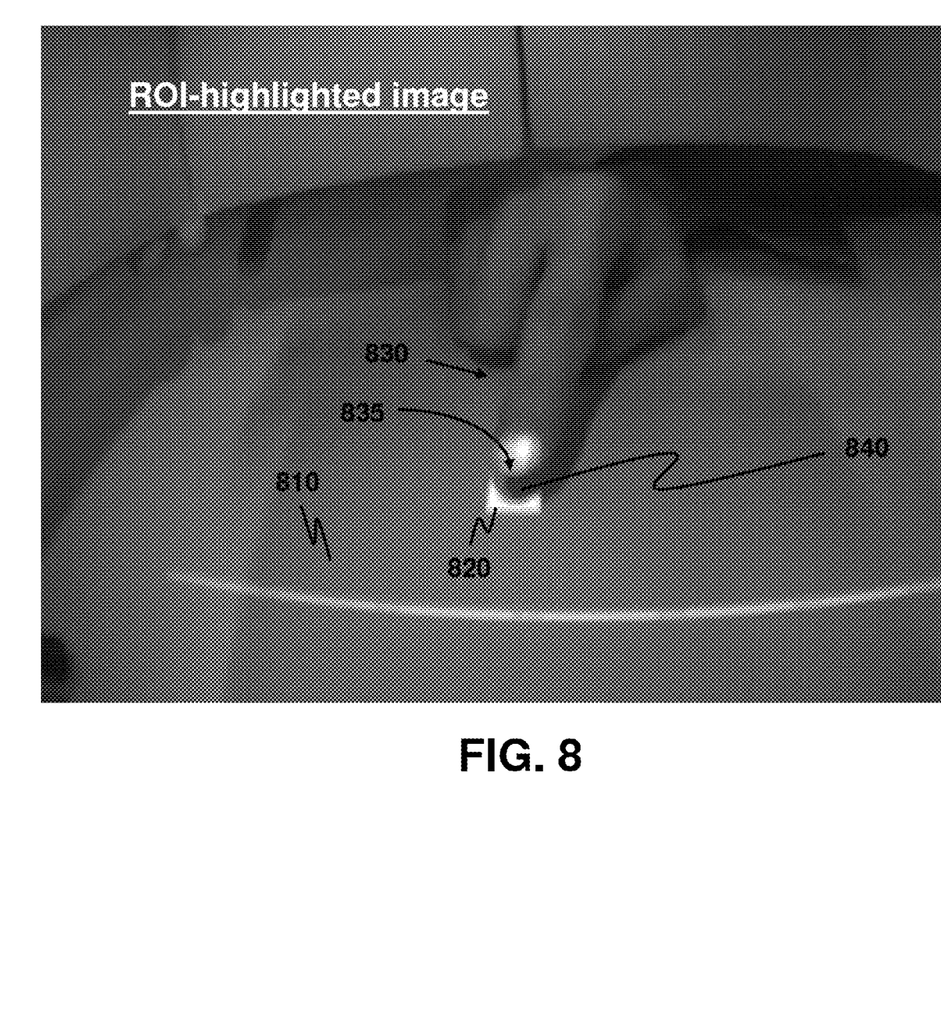
FIG. 8 depicts an example of a ROI-highlighted image, showing that a camera-observed shadow is produced by an object (which is a finger), whereby a camera-observed shadow length can be obtained to estimate the object's height above the reference surface.

The camera is then used to capture a ROI-highlighted image (step 625). An example of the ROI-highlighted image is depicted in FIG. 8. In FIG. 8, the object is a finger 830 and the reference peripheral point is a finger tip 835 of the finger 830. The spot light 820 is projected onto a reference surface 810, forming a shadow 840.

After the ROI-highlighted image is obtained, a camera-observed shadow length, as mentioned above, is estimated (step 630). As is mentioned above, the camera-observed shadow length is a length of the part of the shadow observable by the camera. Estimation of the camera-observed shadow length from the ROI-highlighted image is accomplished by using the surface map.

In case the camera-observed shadow length is substantially close to zero, it can be determined that the object touches the reference surface (step 640). It thereby provides a first piece of positional information. Practically, the camera-observed shadow length is considered to be substantially close to zero if this length is less than a certain threshold value, or if the part of the object's shadow that can be observed by the camera is not detectable. In certain practical applications, it may be sufficient to confirm that the object touches the reference surface. In one embodiment, the positional-information obtaining process is stopped and a next process is initiated if it is confirmed that the object touches the reference surface.

In case the positional-information obtaining process continues after obtaining the first piece of positional information in the step 640, the shadow-projector distance is estimated from the ROI-highlighted image by using the surface map (step 650). As mentioned above, the shadow-projector distance is the distance measured in the reference horizontal direction between the projector and the starting point of the shadow where the starting point is the particular point on the shadow cast by the reference peripheral point.

A second piece of positional information provided by the disclosed method is the object's height above the reference surface. After the camera-observed shadow length and the shadow-projector distance are obtained, the object's height above the reference surface ($H_f$) is estimated in a step 660 based on a set of data including the surface profile, the camera-observed shadow length (S), the shadow-projector distance (D), a distance measured in the reference horizontal direction between the projector and the camera ($L_p$), a distance measured from the projector to the reference surface along a reference vertical direction ($H_p$), and a distance measured from the camera to the reference surface along the reference vertical direction ($H_c$). If the reference surface is substantially flat, the object's height above the reference surface can be computed according to EQN. (4). Note that if the camera-observed shadow length is found to be substantially close to zero, the object's height above the reference surface may be directly set to zero. Also note that the object's height above the reference surface is a Z coordinate constituting the 3D coordinate of the object.

To complete the 3D coordinate, an XY coordinate of the object is obtainable as follows. The Y coordinate can be taken as the distance in the reference horizontal direction between the camera and the reference peripheral point (i.e. $L_f$). The distance $L_f$ is computed by either EQN. (3) or EQN. (5) (step 670). The X coordinate of the object can be obtained directly from a camera captured image and the surface map by identifying the object's position in this camera captured image and then mapping this position to the physical position of the object based on the surface map (step 675). Preferably, this camera captured image is the ROI-highlighted image obtained in the step 625. The 3D coordinate of the object is then obtained based on the XY coordinate, and the object's height above the reference surface as the Z coordinate (step 680), thereby providing a third piece of positional information.

As is mentioned above, the positional-information obtaining process is repeated for a number of times so as to obtain a time sequence of 3D coordinates of the object. This time sequence thereby provides a first piece of motional information. Based on this time sequence, one or more pieces of motional information of the object are obtained. Examples of such one or more pieces of motional information include the object's velocity, an acceleration of the object, a traveling direction thereof, a time history of velocity, a time history of acceleration, and a time history of traveling direction.

In a system that implements the disclosed method, the projector may use visible or invisible light for image projection. The choice of light depends on applications. For example, an interactive projection system requiring an input from a user by pressing his or her finger on a touch pad is preferred to use invisible light, preferably infrared light, for the projector. Similarly, infrared light may also be used by the separate light source in generating the spot light. When infrared light is used by the projector or the separate light source, the camera is then configured to sense at least infrared light in image capturing.

In the implementation of the disclosed method, the projector and the camera are arranged such that (i) a shadow of an object is produced on a reference surface, and (ii) the camera has a field of view preferably covering the whole structured-light pattern projected on the reference surface. In one option, the projector and the camera are arranged with a positional configuration that (i) in the reference horizontal direction, the projector is positioned between the camera and the object when the object is present, and (ii) in the reference vertical direction, the camera is positioned between the projector and the reference surface. It is also optional that a mirror is used to reflect any image projected by the projector onto the reference surface, and to reflect any view appeared on the reference surface for the camera to capture.

In some applications using the disclosed method, the structured-light pattern and the second structured-light pattern that is selected are the same. If the spot light is generated by the separate light source, the projector may be required to project the structured-light pattern only. Under such condition, one low-cost realization of the projector is a light source configured to give out a fixed light pattern.

A system for obtaining positional or motional information of an object with respect to a reference surface is realizable by including a projector and a camera in the system, and configuring the system itself to determine the aforesaid positional or motional information by an embodiment of the disclosed method according to the foregoing description. Optionally, the system is realized as a single unit integrated with the projector and the camera. Usually, one or more processors are embedded in the system for performing computation and estimation steps of the disclosed method.

The method and the system disclosed herein may be used in or as an interactive projection system. In the interactive projection system, the object is a finger of a user, and the reference peripheral point is a finger tip of the finger. A presence of the finger touching the reference surface as detected provides user-input information to the interactive projection system.

The present invention may be embodied in other specific forms without departing from the spirit or essential characteristics thereof. The present embodiment is therefore to be considered in all respects as illustrative and not restrictive. The scope of the invention is indicated by the appended claims rather than by the foregoing description, and all changes that come within the meaning and range of equivalency of the claims are therefore intended to be embraced therein.

What is claimed is:

1. A method for receiving user inputs in a system, the system comprising a projector, a camera and one or more processors, the method comprising obtaining one or more pieces of positional or motional information of an object with respect to a reference surface, the object having a pre-determined reference peripheral point, the one or more pieces of positional information including one or more of the object's height above the reference surface, a three-dimensional (3D) coordinate of the object, and an answer of whether the object touches the reference surface, the one or more pieces of motional information including one or more of a time sequence of 3D coordinates, a velocity, an acceleration, a traveling direction, a time history of velocity, a time history of acceleration, and a time history of traveling direction, wherein the obtaining of the one or more pieces of positional or motional information of the object with respect to the reference surface comprises:

obtaining a surface profile of the reference surface, and a surface map configured to map any point on an image captured by the camera to a corresponding physical location on the reference surface;

at a time instant after the object is identified to be present, initiating a positional-information obtaining process; and     arranging the projector and the camera with a positional configuration such that when the object not touching the reference surface is illuminated by spot light generated by the projector or a separate light source during the positional-information obtaining process, a part of the object's shadow formed on the reference surface along a topographical surface line is observable by the camera, and such that a length of the aforesaid part of the shadow, regarded as a camera-observed shadow length, is usable for uniquely determining the object's height above the reference surface in the positional-information obtaining process.

2. The method of claim 1, wherein the topographical surface line is formed by projecting a line-of-sight path joining the camera and the reference peripheral point on the reference surface.

3. The method of claim 1, wherein the positional-information obtaining process comprises:

determining a region-of-interest (ROI) from a ROI-determination image captured by the camera such that the ROI comprises an area surrounding and including the reference peripheral point;

directing the spot light to an area that substantially covers at least the ROI such that the object around the reference peripheral point is illuminated to form a shadow on the reference surface unless the object is substantially close to the reference surface;

estimating the camera-observed shadow length from a ROI-highlighted image by using the surface map, wherein the ROI-highlighted image is captured by the camera after the spot light is generated; and determining that the object touches the reference surface if the camera-observed shadow length is substantially close to zero, thereby providing a first piece of positional information.

4. The method of claim 3, wherein the positional-information obtaining process further comprises:

estimating a shadow-projector distance from the ROI-highlighted image by using the surface map; and estimating the object's height above the reference surface based on a set of data including the surface profile, the camera-observed shadow length, the shadow-projector distance, a distance measured in a reference horizontal direction between the projector and the camera, a distance measured from the projector to the reference surface along a reference vertical direction, and a distance measured from the camera to the reference surface along the reference vertical direction, thereby providing a second piece of positional information.

5. The method of claim 4, wherein the estimating of the object's height above the reference surface comprises computing $$H_f = \frac{H_c H_p S}{(S + D + L_p)H_p - H_c D}$$

if the reference surface is substantially flat, where $H_f$ is the object's height above the reference surface, S is the camera-observed shadow length, D is the shadow-projector distance, $L_p$ is the distance measured in a reference horizontal direction between the projector and the camera, $H_p$ is the distance measured from the projector to the reference surface along a reference vertical direction, and $H_c$ is the distance measured from the camera to the reference surface along the reference vertical direction.

6. The method of claim 4, wherein the positional-information obtaining process further comprises:

estimating a distance measured in the reference horizontal direction between the projector and the reference peripheral point based on either:
(a) the set of data; or
(b) the object's height above the reference surface, the shadow-projector distance, the distance measured in the reference horizontal direction between the projector and the camera, and the distance measured from the projector to the reference surface along the reference vertical direction;

obtaining an X coordinate of the object from a camera captured image and the surface map; and obtaining the 3D coordinate of the object based on the X coordinate of the object, the distance measured in the reference horizontal direction between the projector and the reference peripheral point, and the object's height above the reference surface, thereby providing a third piece of positional information.

7. The method of claim 6, further comprising:

at a plurality of time instants, repeating the positional-information obtaining process so as to obtain the time sequence of 3D coordinates of the object to thereby provide one piece of motional information.

8. The method of claim 7, further comprising:

computing, according to the obtained time sequence of 3D coordinates, one or more additional pieces of motional information of the object, selected from the velocity, the acceleration, the traveling direction, the time history of velocity, the time history of acceleration, and the time history of traveling direction.

9. The method of claim 1, wherein the obtaining of the surface profile and the surface map comprises:

projecting, by the projector, a structured-light pattern onto the reference surface;

capturing, by the camera, an image of the structured-light pattern that is projected on the reference surface, the object being absent so that the object is not captured in the captured image;

determining the surface profile from the structured-light pattern and the captured image; and computing the surface map based on matching a set of points on the structured-light pattern and an identifiable set of corresponding points in the captured image.

10. The method of claim 9, wherein the structured-light pattern is a structured grid, a regular grid or a rectangular grid.

11. The method of claim 9, further comprising:

detecting if the object is present until the object is identified to be present to thereby trigger initiation of the positional-information obtaining process at the time instant;

wherein:
presence of the object is determined according to a test-for-presence image captured by the camera when a second structured-light pattern is projected by the projector onto the reference surface; and
the second structured-light pattern is either the structured-light pattern or another structured-light pattern adapted to or optimized for the reference surface.

12. The method of claim 11, wherein presence of the object is determined further according to either:

a difference image between the test-for-presence image and a control image of the second structured-light pattern, wherein the control image is computed from the second structured-light pattern according to the surface map; or another difference image between the second structured-light pattern and a reconstructed light pattern, wherein the reconstructed light pattern is reconstructed from the test-for-presence image according to the surface map such that the reconstructed light pattern, if under an assumption of the object's absence, should be similar with the second structured-light pattern.

13. The method of claim 1, wherein the positional configuration is that:

in a reference horizontal direction, the projector is positioned between the camera and the object when the object is present; and in a reference vertical direction, the camera is positioned between the projector and the reference surface.

14. The method of claim 1, further comprising:
using a mirror to reflect any image projected by the projector onto the reference surface, and to reflect any view appeared on the reference surface for the camera to capture.

15. The method of claim 3, wherein the determining of the ROI comprises identifying the ROI by recognizing a pattern on the ROI-determination image such that the pattern substantially matches a feature of the object around the reference peripheral point.

16. The method of claim 3, wherein the projector or the separate light source uses infrared light, and wherein the camera is configured to sense at least infrared light in image capturing.

17. The method of claim 11, wherein the projector uses infrared light for image projection, or the separate light source is an infrared light source, and wherein the camera is configured to sense at least infrared light in image capturing.

18. A system configured to receive user inputs by a process, the process comprising obtaining one or more pieces of positional or motional information of an object with respect to a reference surface, the object having a pre-determined reference peripheral point, the one or more pieces of positional information including one or more of the object's height above the reference surface, a three-dimensional (3D) coordinate of the object, and an answer of whether the object touches the reference surface, the one or more pieces of motional information including one or more of a time sequence of 3D coordinates, a velocity, an acceleration, a traveling direction, a time history of velocity, a time history of acceleration, and a time history of traveling direction, wherein the system comprises a projector, a camera and one or more processors, and wherein the process is arranged according to the method of claim 1.

19. The system of claim 18, wherein the object is a finger, the reference peripheral point is a finger tip of the finger, so that a presence of the finger touching the reference surface provides user-input information to the system.

20. A system configured to receive user inputs by a process, the process comprising obtaining one or more pieces of positional or motional information of an object with respect to a reference surface, the object having a pre-determined reference peripheral point, the one or more pieces of positional information including one or more of the object's height above the reference surface, a three-dimensional (3D) coordinate of the object, and an answer of whether the object touches the reference surface, the one or more pieces of motional information including one or more of a time sequence of 3D coordinates, a velocity, an acceleration, a traveling direction, a time history of velocity, a time history of acceleration, and a time history of traveling direction, wherein the system comprises a projector, a camera and one or more processors, and wherein the process is arranged according to the method of claim 3.

21. A system configured to receive user inputs by a process, the process comprising obtaining one or more pieces of positional or motional information of an object with respect to a reference surface, the object having a pre-determined reference peripheral point, the one or more pieces of positional information including one or more of the object's height above the reference surface, a three-dimensional (3D) coordinate of the object, and an answer of whether the object touches the reference surface, the one or more pieces of motional information including one or more of a time sequence of 3D coordinates, a velocity, an acceleration, a traveling direction, a time history of velocity, a time history of acceleration, and a time history of traveling direction, wherein the system comprises a projector, a camera and one or more processors, and wherein the process is arranged according to the method of claim 8.

* * * * *